Figure 1:
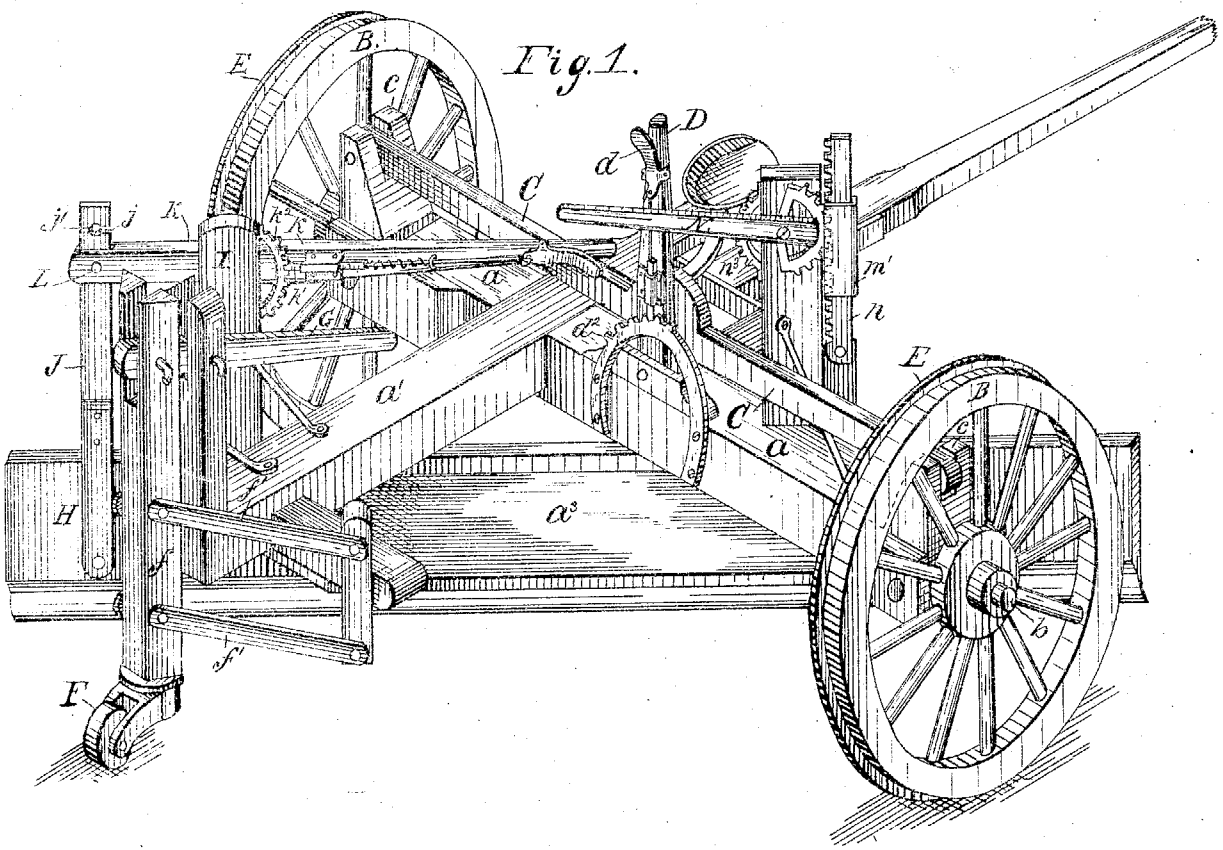

3 Sheets—Sheet 1.

J. D. ADAMS.

ROAD GRADING MACHINE.

No. 10,666. Reissued Dec. 1, 1885.

WITNESSES:

V. M. Hood.

Arthur M. Hood.

INVENTOR:

Joseph D. Adams

By H. P. Wood

Atty.

J. D. ADAMS.

ROAD GRADING MACHINE.

No. 10,666. Reissued Dec. 1, 1885.

WITNESSES:
T. A. Hood.
Arthur M. Hood.

INVENTOR:
Joseph D. Adams
By H. P. Hood
Atty.

3 Sheets—Sheet 3.
J. D. ADAMS.
ROAD GRADING MACHINE.
No. 10,666. Reissued Dec. 1, 1885.
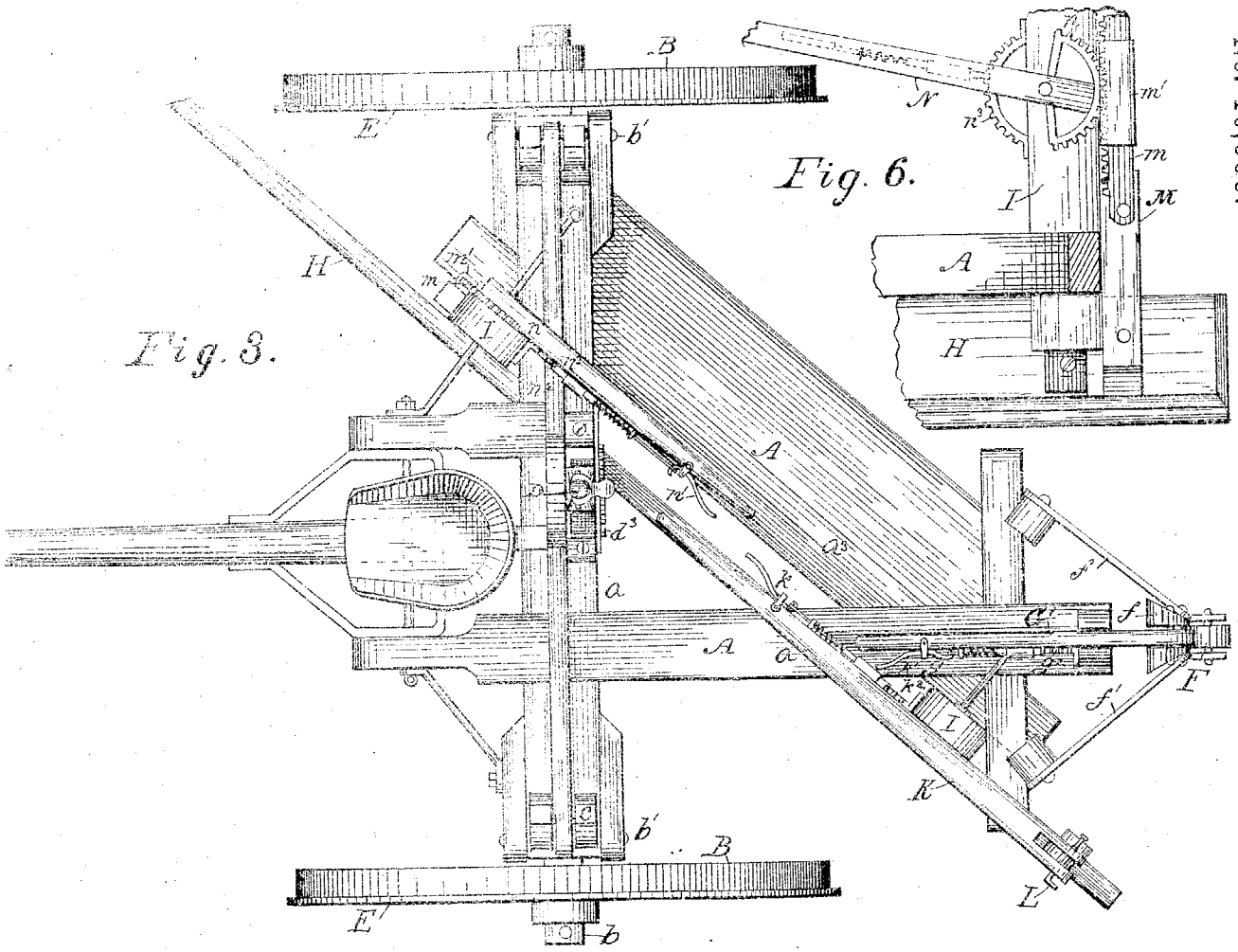
WITNESSES:
[illegible] Wood
[illegible] Wood
INVENTOR:
Joseph D. Adams
By C. P. Wood
Atty.

UNITED STATES PATENT OFFICE.

JOSEPH D. ADAMS, OF MARSHALL, INDIANA.

ROAD-GRADING MACHINE.

SPECIFICATION forming part of Reissued Letters Patent No. 10,666, dated December 1, 1885.

Original No. 316,165, dated January 6, 1885. Application for reissue filed October 29, 1885. Serial No. 181,323.

*To all whom it may concern:*

Be it known that I, JOSEPH D. ADAMS, a citizen of the United States, residing at Marshall, in the county of Parke and State of Indiana, have invented certain new and useful Improvements in Road-Grading Machines; and I do hereby declare the following to be a full, clear, and exact description of the invention, such as will enable others skilled in the art to which it appertains to make and use the same.

My invention relates to certain new and useful improvements in that class of wheeled road-grading machines in which the scraper or leveling bar is suspended so that its opposite ends are independently adjustable vertically beneath a frame or axle having suitable carrying-wheels, and in which the scraper or leveling bar is arranged obliquely to the line of movement of the machine and to the axes of the carrying-wheels.

The objects of my improvements are, first, to produce a road-grading machine of the class mentioned in which the spindles on which the carrying-wheels turn are adjustably secured to the carrying frame or axle, for the purpose of inclining the main wheels simultaneously and in the same direction by means of intermediate mechanism connecting the said spindles, and arranged to be easily controlled by the operator when the machine is in operation, so that the axes of the wheel-spindles will be substantially at a right angle to the direction of pressure, due to the combined weight of the machine, and the side draft, due to the load and the oblique position of the scraper, and the wheels will be in a position to receive and resist said side draft most effectually and to move without undue friction against the ends of their hubs, thereby obviating the great friction attendant to this class of machines, and lessening the draft.

My objects are, further, to prevent the main carrying-wheels from slipping sidewise when the machine is in operation, and to provide means for adjusting the machine, as well as the scraper or leveling bar, to suit different inclinations of the road; and to this end the invention consists in novel features of construction and combination and arrangement of parts, all as will be hereinafter fully described, and set forth in the claims hereto annexed.

Figure 2:
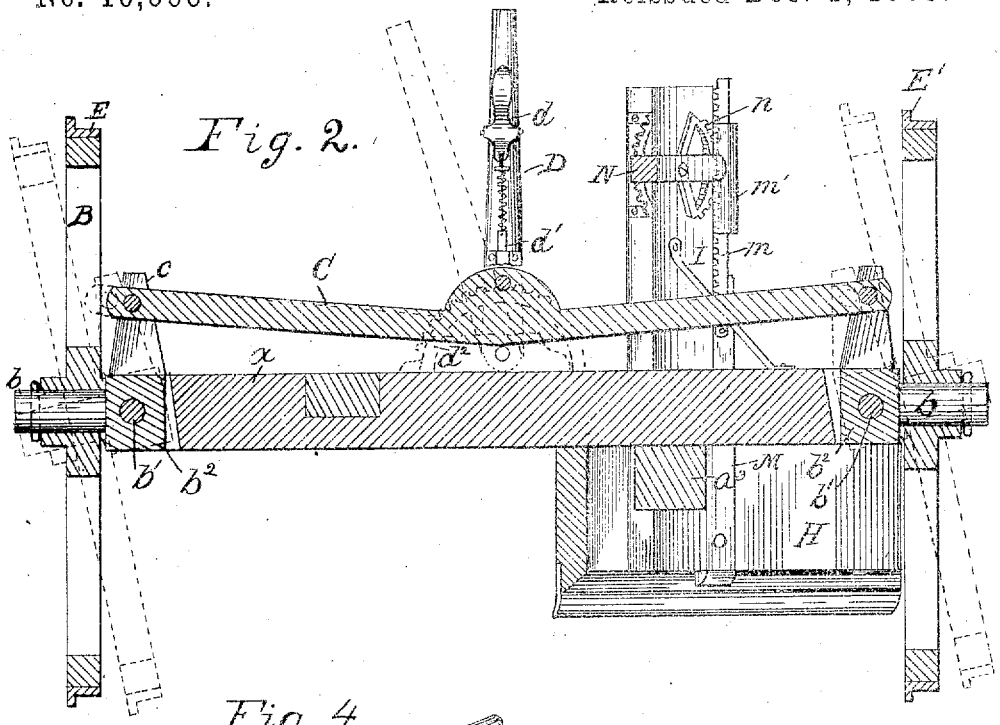
Figure 4:
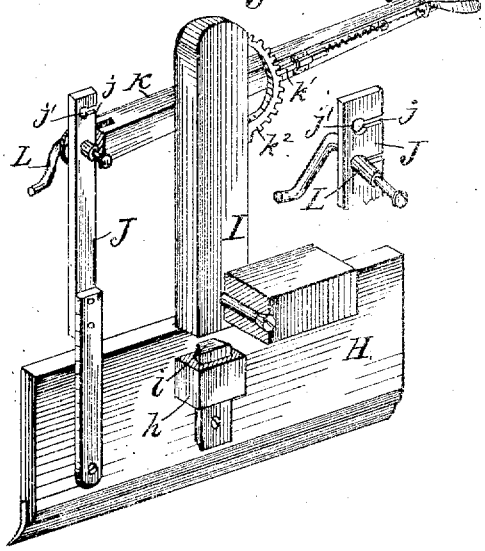
Figure 5:
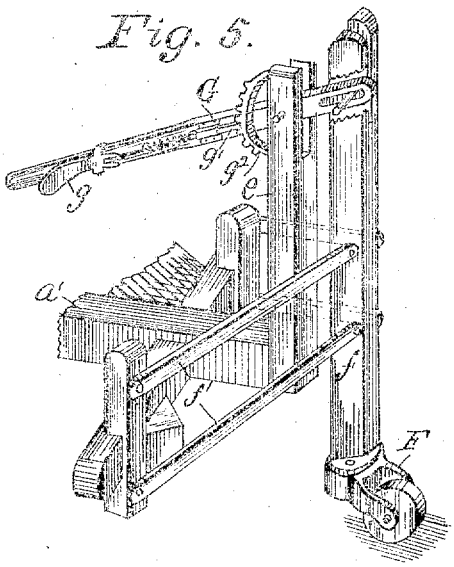

Referring to the accompanying drawings, Figure 1 represents a view in perspective of my improved machine. Fig. 2 is a vertical section through the main axle and centers of the main carrying-wheels, showing in dotted lines one position of the said wheels when the machine is at work. Fig. 3 is a top view or plan. Figs. 4, 5, and 6 are detail views, to be hereinafter referred to.

In the drawings, A represents the triangular main frame of the machine, consisting of the transverse beam or main axle $a$, right-angular beam $a'$, and obliquely-arranged beams $a^2$, framed and secured together in any suitable manner.

B B represent the main supporting-wheels of the machine, mounted and secured upon the spindles $b$ $b$ in the usual manner.

For the purpose of allowing the position of the wheels and spindles to be changed to resist the changed direction of pressure thereon due to the load and the oblique position of the scraper or leveling bar H when the machine is in operation, said spindles have their inner ends pivoted to the ends of the main axle $a$, so as to swing in a vertical plane thereon, by means of journals $b'$ $b'$, working in journal-bearings $b^2$ $b^2$, secured to the said main-axle. The inner ends of the wheel-spindles are also provided with slotted vertical uprights $e$ $e$, pivotally connected by a transverse bar, C, having a pivoted hand-lever, D, centrally connected thereto, which hand-lever is secured in any desired position it may be adjusted to by a small pivoted finger-lever, $d$, having a spring-pawl, $d'$, adapted to engage the teeth of the semicircular bar $d^2$, secured to the axle $a$.

By means of the pivoted spindles and above-described operating mechanism the wheels B B may be thrown from their normal right-angular or vertical position with reference to the main axle $a$ to an acute or oblique angle thereto, as shown in dotted lines, Fig. 2. This angular adjustment of the spindles and wheels brings the bearing of the hubs, when the machine is in operation, substantially at right angles to the axes of and uniformly along the length of the wheel-spindles, whereas without such adjustable spindles the bearings of the hubs of the two wheels must be partially against the ends of the hubs and diagonally across the spindles, so that the spindles touch at opposite ends on opposite sides of the interiors of the hubs, and are cramped therein, causing great friction; but with the adjustable spindles and main wheels, as above described, there is consequently less friction, and thereby a great saving of draft.

The wheels B B have projecting circular metallic flanges E E, arranged as follows: the left wheel a continuous flange, E, on the outside, and the right wheel a continuous flange, E, on the inside of a left-hand machine, and vice versa in a right-hand machine. The object attained by the flange is to prevent the machine from slipping from the load, the wheels, being thrown at an angle, as before described, serving to drive the flanges into the ground, thereby holding the wheels firmly in position.

F represents a caster-wheel for supporting the rear end of the machine, which caster-wheel is journaled in the lower end of a vertical standard, *f*, pivotally connected by parallel bars *f′ f′* to vertical uprights secured to the main frame of the machine.

To the rear end of the beam *a′* is secured a vertical upright, *e*, and said upright and standard *f* are provided with slots in their upper ends, in which is fulcrumed a lever, G, having a finger-lever, *g*, provided with a spring-pawl, *g′*, adapted to engage the teeth of the semicircular bar $g^2$, secured to said upright *e*, and thereby secure the lever G in any desired position. By raising or lowering said lever the rear end of the main frame will be respectively raised or lowered.

H represents the usual scraper or leveling bar, having pivoted upon its rear sides dovetailed blocks *h h*, adapted to work in corresponding grooves, *i*, formed in the vertical uprights I I, secured and braced to the main frame of the machine, for the purpose of guiding and securing the scraper from any lateral movement, while permitting of a free vertical movement in adjusting the scraper to any desired height.

The rear end of the scraper-bar is pivotally and adjustably connected to the pivoted lever K in the following manner: A vertical bar, J, is secured at its lower end to the scraper-bar and provided at its upper end with a series of horizontal slots, *j*, terminating at their inner ends in enlarged circular openings *j′*. The pin L, which connects said bar J with the lever K, is so made that at one end its diameter corresponds with the slots *j*, while at its other end the diameter corresponds with the circular openings *j′*. (See Fig. 4.) The pin L can therefore be laterally adjusted, so that the smaller diameter of the pin will come opposite the slot *j*, when the bar J can be slid to one side and raised or lowered to admit the pin in any one of the horizontal slots when it is desired to adjust the scraper-bar, after which the pin can be adjusted, so as to permit the largest diameter of the pin to enter the opening *j′*, thus securing or locking the bar in position. By means of the pivoted lever K, having a finger-lever, *k*, and a spring-pawl, *k′*, adapted to engage the teeth of the semicircular bar $k^2$, the scraper-bar can be vertically adjusted and secured in any desired position when in operation. The front end of the scraper-bar can also be vertically adjusted, which is acccomplished in the following manner: A vertical bar, M, secured to the scraper-bar, is provided at its upper end with a toothed bar, *m*, which slides in a guide-bar, *m′*, secured to the bar or upright I, and meshes with a toothed segment, *n*, secured to a lever, N, and by raising and lowering said lever the scraper-bar will be vertically adjusted, and can be secured in any desired position by the finger-lever *n′*, having a spring-pawl, $n^2$, adapted to engage the teeth of the semicircular bar $n^3$.

I am aware that road-scraping machines have before been made in which the carrying-wheels were mounted on spindles which were pivoted to the main axle, and were arranged to be inclined toward or from each other at opposed angles, for the purpose of raising the wheels and throwing the entire weight of the machine upon the scraper, which in such cases was arranged substantially parallel with the main axle and at right angles to the line of draft, and I do not claim such a construction.

I am also aware that it is not new to pivot the scraper-bar to vertical uprights, said uprights passing through suitable guide-pieces, so that the scraper-bar may be guided in adjusting it to different elevations, and I therefore make no broad claim to such construction.

It will be observed that by my improved machine, as above described, I am enabled to adjust the scraper or leveling bar to suit any inclination of the road, and also adjust it in accordance with the adjustment of the main supporting-wheels.

The driver's seat and the tongue or pole are arranged in the usual manner in this class of machines.

The operation of the machine is obvious from the foregoing, and further description is therefore deemed unnecessary.

Having thus fully described my invention, what I claim as new, and desire to secure by Letters Patent, is—

1. In a road-grading machine, the combination, with the scraper or leveling bar and supporting-wheels, of the pivoted and adjustable spindles and the adjustable caster-wheel, substantially as and for the purpose specified.

2. In a road-grading machine, the combination of the pivoted and adjustable spindles and the supporting-wheels provided with the projecting circular metallic flanges, substantially as and for the purpose specified.

3. In a road-grading machine, the combination, with a carrying-frame having a main axle and a scraping or leveling bar suspended from and beneath and arranged obliquely to the line of draft of said frame, of a pair of wheel-spindles pivoted to opposite ends of said main axle, carrying-wheels mounted on said spindles, and intermediate mechanism connecting said spindles, whereby the spindles and their wheels are simultaneously inclined in the same direction and at the same angle, all combined and arranged to co-operate substantially as and for the purpose set forth.

4. In a road-grading machine, the combination of the slotted caster-wheel standard, the parallel bars *f′ f′*, pivoted to each side of said standard and connecting the same to the main frame, the upright *e*, slotted at its upper end, and the lever G, fulcrumed in said slotted standard *e* and loosely pivoted to the upright *f*, substantially as described, and for the purpose specified.

5. In a road-grading machine, the combination of the scraper or leveling bar having the blocks *h h*, vertical uprights I I, having corresponding guide-grooves for said blocks, and mechanism for connecting and adjusting said bar relative to the main frame, substantially as herein shown and described.

6. The combination, with the scraper or leveling bar and the pivoted lever K, of the vertical bar *J*, having the horizontal slot *j*, enlarged circular opening *j′*, and a lock-pin having its ends of different diameters, substantially as and for the purpose herein shown and described.

JOSEPH D. ADAMS.

Witnesses:
H. P. HOOD,
V. M. HOOD.